Jan. 13, 1953     A. F. UNDERWOOD     2,625,448
BEARING LUBRICATION
Filed April 22, 1949

Inventor
Arthur F. Underwood
By Spencer, Willits, Helmig & Baillio
Attorneys

Patented Jan. 13, 1953

2,625,448

UNITED STATES PATENT OFFICE 2,625,448

BEARING LUBRICATION

Arthur F. Underwood, Grosse Pointe, Mich., assignor to General Motors Corporation, Detroit, Mich., a corporation of Delaware Application April 22, 1949, Serial No. 89,131

4 Claims. (Cl. 308—78)

This invention relates generally to bearings and is more particularly concerned with the lubrication of bearings and journals subjected to loadings having a varying direction such, for example, as wrist pin bushings.

It has been demonstrated that the clearance space between a wrist pin or the like and its bearing is not kept full of lubricating oil by previously employed grooves and oil holes. This leads to noisy bearings when the clearance is enlarged by wear or when the assembled clearance is too great.

I have found that the foregoing difficulty can be eliminated by providing relatively shallow grooves at each end of the bearing whereby oil can be drawn into the clearance space as needed. The size of each of the grooves is important. If the volume of each groove is too small, sufficient oil will not be retained therein to fill the clearance space between the bearing and journal. On the other hand if grooves are too large, under certain conditions the grooves may not stay full of oil and the result will be incomplete filling of the clearance space. In accordance with the foregoing requirements the combined volume of the two grooves may vary from a volume at least equal to the clearance volume between the journal and bearing, to up to about ten times the clearance volume. Oil to the two grooves may be supplied by any suitable means.

Reference is herewith made to the accompanying drawing illustrating a construction in accordance with one embodiment of the invention. In the drawing.

Figure 1:
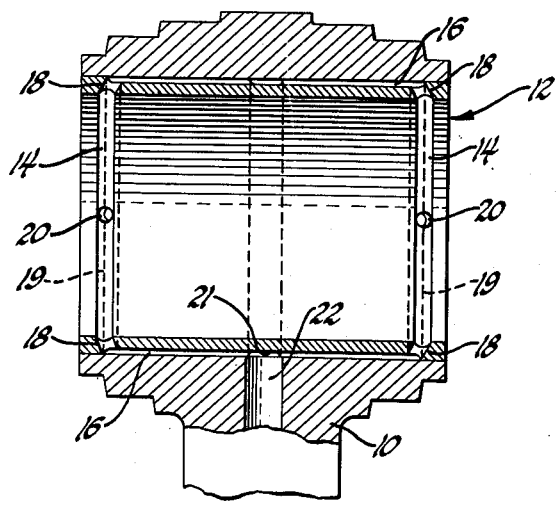
Figure 1 is a sectional view through the upper end of a connecting rod having a wrist pin bushing therein.
Figure 2:
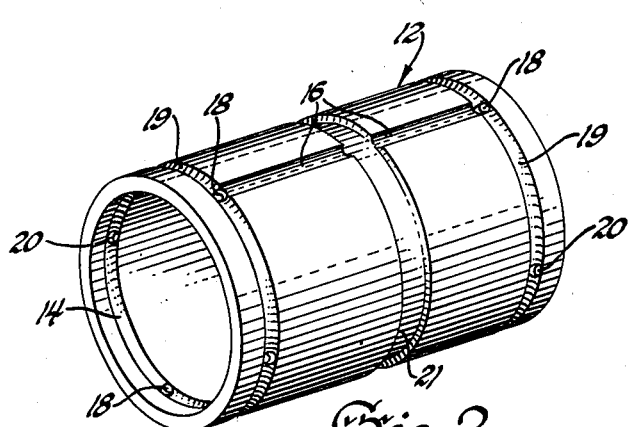
Figure 2 is a perspective view of the wrist pin bushing of Figure 1.

Reference numeral 10 indicates generally a connecting rod having in the upper end thereof a wrist pin bushing 12. The inner surface of the bushing 12 which contacts the wrist pin has a circumferentially extending groove 14 near each end thereof. The outer surface of the bushing has two similar slots 16 spaced 180° apart extending lengthwise of the bushing but stopping short of the ends of the bushing. Holes 18 extending through the bushing connect the ends of the slots 16 with the circumferentially extending grooves 14 adjacent each end of the bushing. Also shown in the drawing are two circumferentially extending grooves 19 in the outer surface of the bushing. Holes 20 similar to the holes 18 connect the grooves 19 with the corresponding grooves 14 in the inner surface of the bushing. The outer face of the bushing also has a circumferentially extending groove 21 intermediate the ends of the bushing which intersects the two slots 16 which extend lengthwise of the bushing. The connecting rod has a passageway 22 formed therein which leads to the groove 21.

Figure 3:
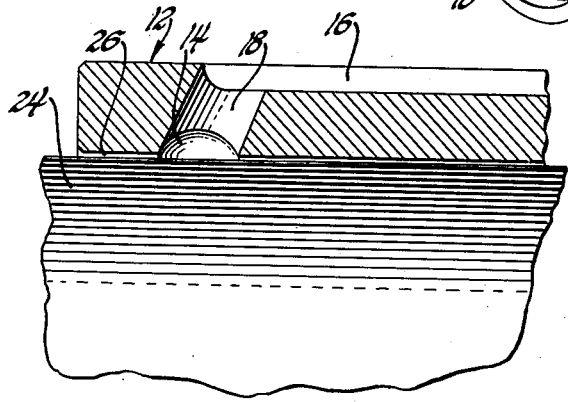
Figure 3 is an enlarged view partly in section, showing a portion of the wrist pin bushing, its cooperating wrist pin and the clearance space between the two.

Referring to Figure 3 there is shown a wrist pin 24 within the bushing 12. Clearance space between the wrist pin and its bushing is indicated at 26. The volume of the two circumferentially extending grooves 14 may vary from a volume at least equal to that of the clearance volume between the pin and its bushing to up to about 10 times as large.

In operation oil under pressure is fed through the passageway 22 in the connecting rod to the groove 21, then to the lengthwise extending slots 16 and then to the two circumferentially extending grooves 14 by means of the holes 18. Oil from the slots 16 also can flow into the external grooves 19 and by means of the holes 20 pass into the inner circumferentially extending grooves 14 as required. The external grooves 19 and holes 20 provide additional paths for flow of oil into the inner grooves 14. In many cases the external grooves 19 and holes 20 are unnecessary and may be eliminated. Any other suitable means than those shown and described may be employed for keeping the inner grooves 14 completely filled with lubricating oil. Oil as needed is drawn into the clearance space between the wrist pin and bushing to keep the clearance space filled with lubricating oil.

While the drawing illustrates an embodiment of the invention in which a wrist pin and its bushing are employed, the invention is not limited thereto and the principles of the invention are applicable to the lubrication of all bearings and journals subjected to loadings having a varying direction.

I claim:

1. A journal and bearing therefor subjected to a loading that is variable in direction, said bearing having a circumferentially extending oil groove adjacent each end of the bearing in the face of the bearing which contacts the journal, the two grooves having a combined volume at least equal to the volume of the clearance space between the journal and bearing and not greater than about ten times said clearance volume, and means for keeping the two grooves filled with lubricating oil.

2. A wrist pin and bushing therefor, said bushing having a circumferentially extending oil groove adjacent each end of the bushing in the inner face of the bushing adjacent the wrist pin, the two grooves having a combined volume at least equal to the volume of the clearance space between the wrist pin and bushing and not greater than ten times said clearance volume, said bushing also having spaced slots extending lengthwise of the bushing in the outer face of the bushing and stopping short of the ends of the bushing and holes connecting the opposite ends of the slots with the two circumferentially extending oil grooves, and means for forcing oil under pressure through the slots and holes into the two circumferentially extending oil grooves.

3. The combination which includes a connecting rod having an oil passage therein, a wrist pin bushing in said connecting rod, and a wrist pin in said wrist pin bushing, said bushing having a circumferentially extending oil groove in the outer face thereof communicating with the oil passage in the connecting rod, a pair of slots in the outer face of said bushing in communication with said circumferentially extending oil groove and stopping short of the ends of the bushing, a circumferentially extending oil groove in the inner face of the bushing adjacent each end of the bushing, the two grooves in the inner face of the bushing having a combined volume at least equal to the volume of the clearance space between the wrist pin and bushing and not greater than about ten times said clearance volume, and passages connecting the ends of said slots with the grooves in the inner face of the bushing.

4. A journal and bearing therefor subjected to a loading that is variable in direction, said bearing having a circumferentially extending oil groove adjacent each end of the bearing in the face of the bearing which contacts the journal, the two grooves having a combined volume at least equal to the volume of the clearance space between the journal and bearing and not greater than about ten times said clearance volume, an oil passage extending from each of the grooves to the outer face of said bearing and means for forcing oil under pressure through the oil passages into the two circumferentially extending oil grooves to keep the two grooves filled with lubricating oil.

ARTHUR F. UNDERWOOD.

REFERENCES CITED

The following references are of record in the file of this patent:

UNITED STATES PATENTS

| Number | Name | Date |
|--------|------|------|
| 1,090,773 | Winton | Mar. 17, 1914 |
| 2,289,233 | Beall | July 7, 1942 |

FOREIGN PATENTS

| Number | Country | Date |
|--------|---------|------|
| 353,971 | Germany | May 29, 1922 |